United States Patent [19]
Madsen

[11] Patent Number: 5,803,578
[45] Date of Patent: Sep. 8, 1998

[54] HEADLAMP MOUNTING SYSTEM

[75] Inventor: Steven Raymond Madsen, Muncie, Ind.

[73] Assignee: General Motors Corporation, Detroit, Mich.

[21] Appl. No.: 919,545

[22] Filed: Aug. 28, 1997

[51] Int. Cl.⁶ .................................................... B60Q 1/04

[52] U.S. Cl. ........................... 362/80; 362/285; 362/418; 362/61

[58] Field of Search .................................. 362/61, 80, 66, 362/287, 418, 285

[56] References Cited

U.S. PATENT DOCUMENTS 4,639,840  1/1987  McMahan et al. ........................ 362/80
4,742,435  5/1988  Van Duyn et al. ....................... 362/80

*Primary Examiner*—Thomas M. Sember
*Attorney, Agent, or Firm*—Vincent A. Cichosz

[57] ABSTRACT

A headlamp mounting system includes upper and lower mounting tabs having substantially aligned apertures therethrough. A headlamp assembly has corresponding upper and lower apertures at either end of a channel joining the apertures. The headlamp assembly wedges between the mounting tabs such that the respective apertures are offset. A cam pin is inserted through the apertures in a first rotational position and from there rotated to a second rotational position to draw the apertures into alignment and snug the headlamp assembly to the vehicle support bracket.

8 Claims, 3 Drawing Sheets

HEADLAMP MOUNTING SYSTEM

TECHNICAL FIELD

The present invention is related to automotive headlamps.

BACKGROUND OF THE INVENTION

Composite headlamps generally are characterized by reflector housings sealed to lens covers including refractive optics. The headlamp is mounted to a headlamp mounting bracket which incorporates vertical and horizontal headlamp adjusting mechanisms to allow for precise aiming of the headlamp when installed into a vehicle. The headlamp mounting bracket is fixably secured to a vehicle support bracket typically by way of threaded fasteners. Access to fasteners for headlamps is extremely limited in most vehicles and usually must be achieved in top down fashion through the vehicle's transverse radiator support bracket. The threaded fasteners commonly take the form of threaded pins which are quite long to allow for passage through a mounting hole in the top of the headlamp mounting bracket to a threaded hole or spring clip beyond the bottom of the intermediate headlamp bracket and positioned on the vehicle support bracket. Such pins are typically 150 cm or more in length. This arrangement is inherently difficult to assemble especially in a mass production environment owing in part to the necessity of the assembler to align the threaded end of the pin into the threaded hole or spring clip blindly while handling only the opposite end of the pin. Furthermore, the threaded fasteners require assembly tools for torqueing the fasteners the addition of which is desirably avoided. Similarly, such fastening technique is cumbersome in servicing the vehicle's headlamp in the field.

SUMMARY OF THE INVENTION

The present invention advantageously eliminates power fastening tools in the assembly of a headlamp to a vehicle. A headlamp assembly, which may include a headlamp adjustably mounted to a headlamp bracket, includes a first aperture. A vehicle support bracket attached to the vehicle includes a second aperture. The headlamp assembly is mated to the vehicle support bracket such that the first and second respective apertures are offset. A cam pin or eccentric pin is inserted through the offset apertures in a first orientation to loosely interlock the headlamp assembly and vehicle support bracket. The cam pin is rotated aligning the apertures and drawing the headlamp assembly snugly to the vehicle support bracket.

In accordance with a preferred embodiment of the invention, upper and lower tabs extending from the vehicle support bracket substantially aligned apertures therethrough. The headlamp assembly is wedged between the upper and lower mounting tabs and has corresponding upper and lower apertures.

In accordance with another aspect of the invention, the upper and lower apertures of the headlamp assembly are joined by a channel to aid in guiding the cam pin during insertion.

BRIEF DESCRIPTION OF THE DRAWINGS

FIG. 1 is a disassembled view of an exemplary headlamp mounting system in accordance with the present invention;

FIGS. 2A–2C illustrate an assembly sequence and certain preferred features of an exemplary headlamp mounting system in accordance with the present invention; and, FIG. 3 is a sectional view along the axis of the pin including alignment detail of vehicle support bracket and headlamp mounting bracket in accordance with the present invention.

DESCRIPTION OF THE PREFERRED EMBODIMENT

With reference to the various figures, a headlamp mounting system 10 is illustrated. The two major mating components include a vehicle support bracket 11 and headlamp mounting bracket 13. The vehicle support bracket may be located forward of the vehicle's transverse radiator support member (not shown) and fastened thereto. Also not separately illustrated for clarity is the composite headlamp which is adjustably secured to the headlamp mounting bracket 13 in conventional fashion. Together the headlamp and headlamp mounting bracket may be referred to herein as the headlamp assembly. The vehicle support bracket 11 may include a major access opening 41 for allowing rear access to portions of the headlamp assembly, particularly to the bulb, from between the radiator support and vehicle support bracket 11. Similarly, the headlamp mounting bracket may include a bulb access opening 23 for allowing rear access to the bulb from behind the headlamp assembly.

In the present embodiment, a pair of lower mounting tabs 18A and 18B are horizontally spaced apart on scale with the width of the headlamp assembly and are substantially vertically aligned with a corresponding pair of upper mounting tabs 19A and 19B which are likewise horizontally spaced apart. The mounting tabs are integral with the vehicle support bracket 11. Each mounting tab has a respective vertical through-hole 43A, 43B, 45A, and 45B. At least one of the facing surfaces 31A, 33A, 31B, and 33B of each pair of vertically aligned mounting tabs, for example 19A and 18A, is preferably inclined such that the vertical spacing between the facing surfaces closes toward the proximal end of the tabs and opens toward the distal ends. Beneath each lower mounting tab, 18A and 18B, is a respective shelf 17A and 17B providing an insertion stop for respective cam pins 15A and 15B. An exemplary material for the vehicle support bracket is glass filled polypropylene which may be readily formed using conventional injection molding processes.

The headlamp mounting bracket 13 has a pair of vertical channels 25A and 25B horizontally separated by substantially the same horizontal separation between the pairs of vertically aligned upper and lower mounting tabs on the vehicle support bracket 11. The headlamp mounting bracket 13 is loaded between the vertically aligned pairs of mounting tabs such that the channels 25A and 25B substantially align with the holes in the mounting tabs. An exemplary material for the headlamp mounting bracket is glass filled polypropylene which may be readily formed using conventional injection molding processes.

An alignment pin and complementary hole, or other alignment aid, integrated into the headlamp bracket and vehicle mounting bracket may assist in appropriate alignment of the brackets during assembly. The headlamp mounting bracket bears against the opposing surfaces of the vehicle support bracket mounting tabs 33A, 31A, 33B, and 31B, at similarly inclined surfaces 51A, 53A, 51B, and 53B on the headlamp mounting bracket. The mounting tabs are vertically spaced such that an interference fit is established with the headlamp mounting bracket thus preventing the headlamp mounting bracket from bottoming out against the vehicle support bracket. It can be appreciated that the mounting tabs are engaged to the headlamp mounting bracket and provide the support therefor.

The through holes in the mounting tabs are tightly sized to accommodate the major (i.e. largest) diameter of the cam pins 15A, 15B without hindering insertion or rotation. The vertical channels of the headlamp mounting bracket open at opposite ends through slotted holes having major axes substantially normal to the assembly insertion of the headlamp mounting bracket to the vehicle support bracket. The holes and slots overlap with the slots offset forward of the holes when the headlamp mounting bracket is preliminarily assembled with a slight interference fit between the mounting tabs 18A,19A.

Figure 1:
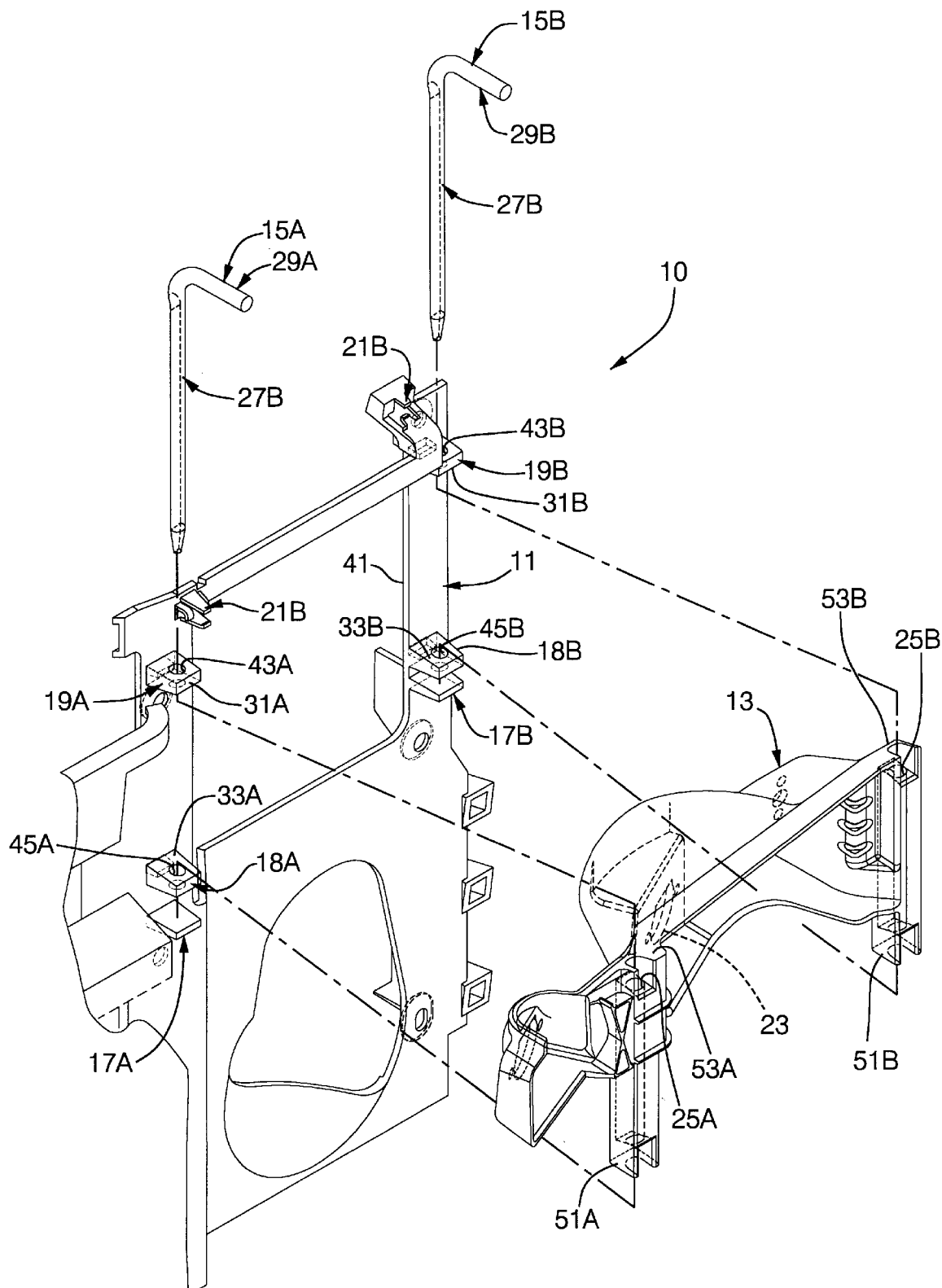
Figure 2A:
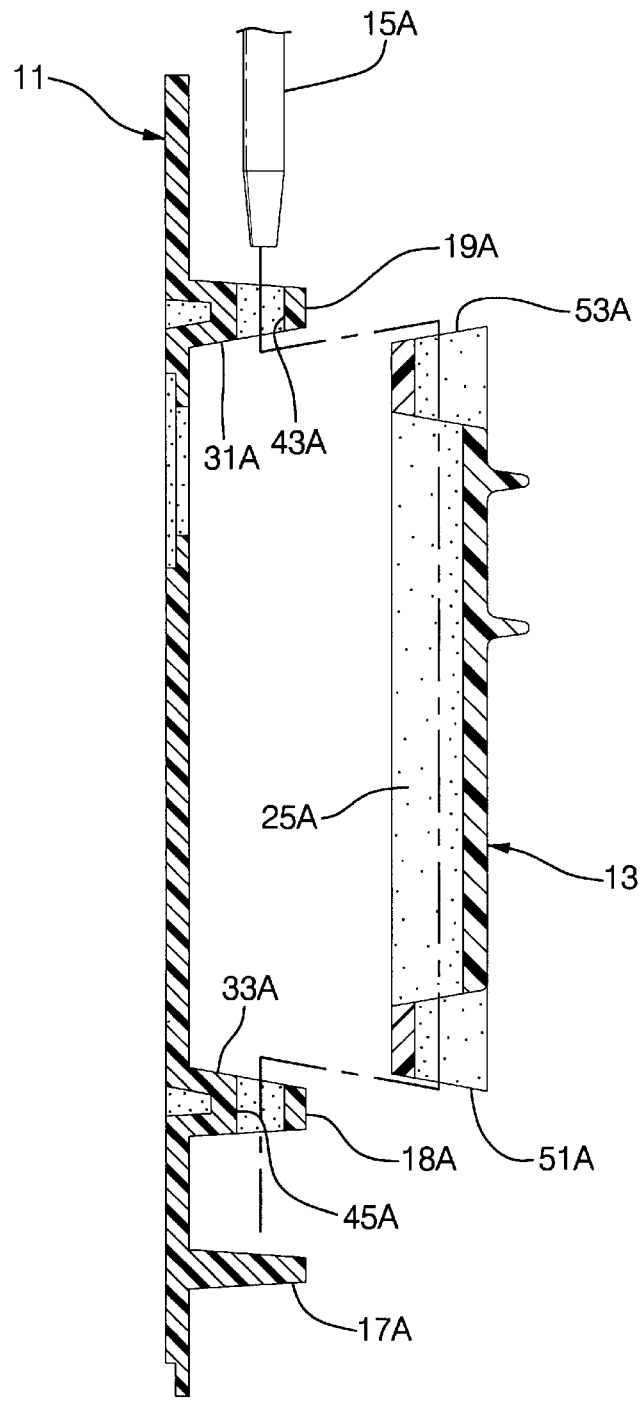
Figure 3:
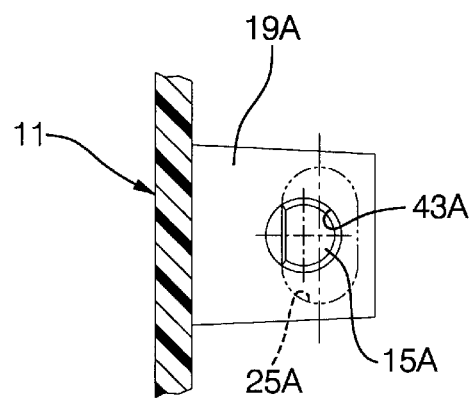
Figure 2B:
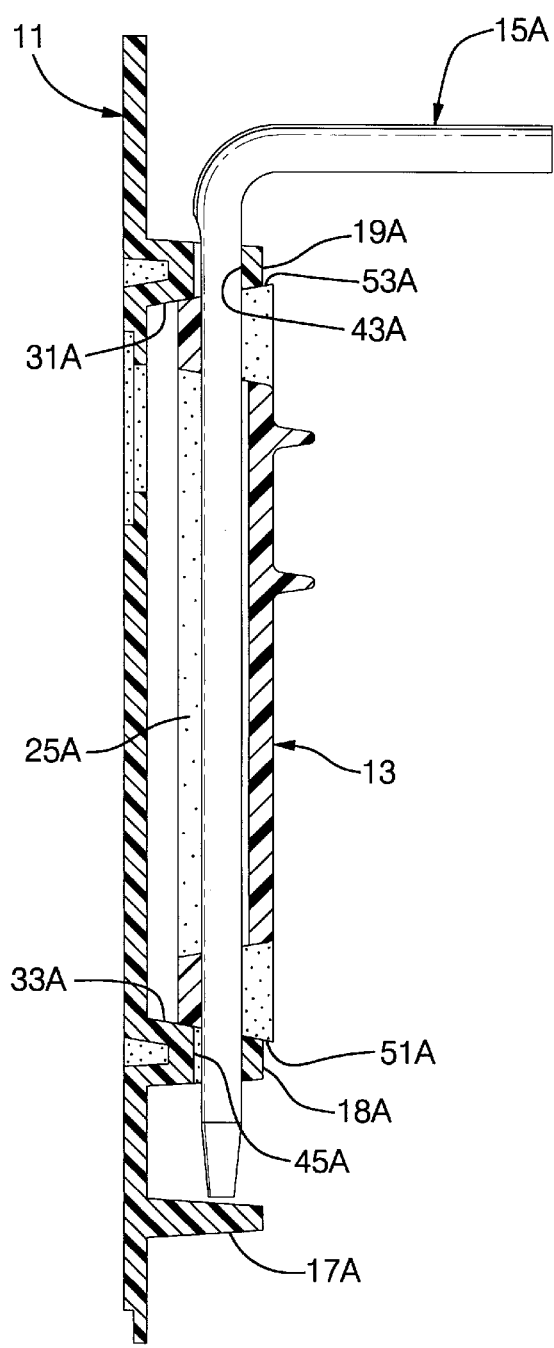

While most of the following description is given with respect to one of the two mounting tab pairs and corresponding channel and cam pin, it is to be understood that the description is applicable to the other of the two mounting tab pairs and corresponding channel and cam pin. Subsequent to loading the headlamp mounting bracket between the mounting tabs 18A, 19A and appropriate alignment of the mounting tab through holes and vertical channels, the cam pins are inserted through the respective upper mounting tab, vertical channel, and lower mounting tab thus capturing the headlamp mounting bracket to the vehicle support bracket. The cam pins 15A, 15B in the present embodiment include elongated inserted portions 27A and 27B and shorter lever portions 29A and 29B. The pins are seen to be substantially circular in cross section with the exception of a flat formed along the length of the elongated inserted portions 27A. The tips of the elongated inserted portions 27A are preferably tapered to aid in insertion. The inserted tips of the cam pins come to rest on the respective shelves 17A. The cam pins are inserted with the smallest diametrical cross section substantially parallel to the assembly insertion direction of the headlamp mounting bracket to the vehicle support bracket. In other words, the greatest diametrical cross section of the cam pins are substantially normal to the assembly insertion direction of the headlamp mounting bracket to the vehicle support bracket. In the present embodiment, the flat is located toward the rear of the vehicle upon preliminary assembly. FIGS. 2B and 3 illustrate the initial insertion orientation of the cam pin and the initial alignment of the hole and slot of the mounting tabs and vertical channels, respectively.

Figure 2C:
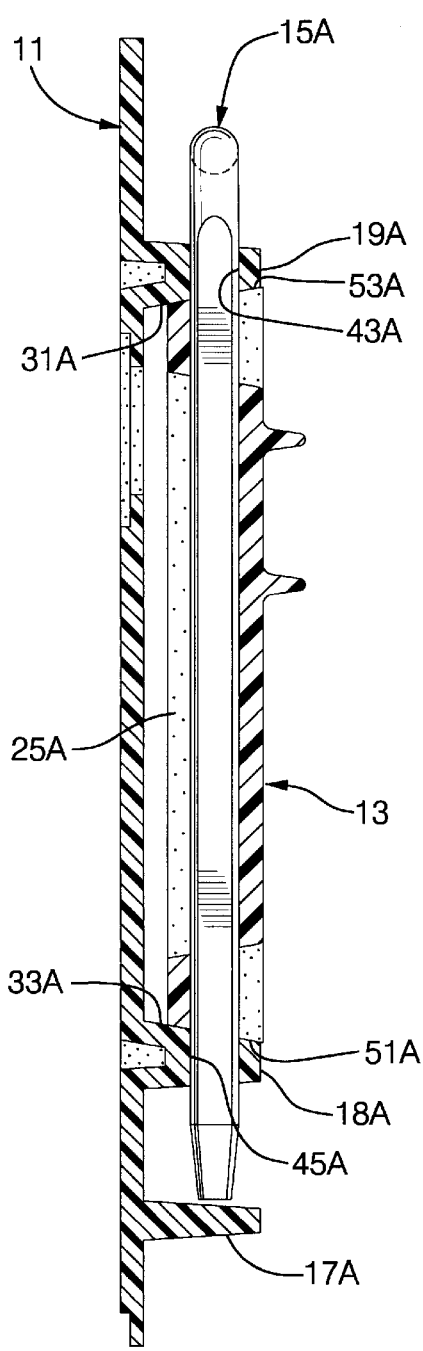

Finally, each cam pin is rotated substantially 90 degrees as illustrated in FIG. 2C which aligns the major diametrical cross section of the cam pins with the insertion direction of the headlamp mounting bracket to the vehicle support bracket. This draws the headlamp mounting bracket and vehicle support bracket together by forcing the headlamp mounting bracket further rearward toward the vehicle support bracket. The slight interference fit of the headlamp mounting bracket to the mounting tabs of the vehicle support bracket opposes the further rearward movement of the headlamp mounting bracket and provides for a snug compressive fit of the headlamp mounting bracket between the mounting tabs.

Though the embodiment described in detail demonstrates a slotted aperture in the headlamp mounting bracket and a hole aperture in the vehicle support bracket, the hole and slot characteristics may be reversed thereby resulting in the hole aperture being in the headlamp mounting bracket and the slot aperture being in the vehicle support bracket. It will be apparent in such case that the flat formed along the length of the elongated inserted portions 27A, 27B would be oppositely positioned upon insertion into the apertures during preliminary assembly thus suggesting that the cam pin be modified to maintain the accessibility of the lever portions 29A, 29B forward in the vehicle. Furthermore, the cam pins have been illustrated with respect to a preferred geometry comprising a substantially circular cross sectional profile with a flat along the length. Alternative exemplary cross-sectional geometries include conventionally lobed cams, ellipsoids or other alternatives having minor and major diametrical cross sections in appropriate areas of the cam pin as describe herein.

Each respective cam pin 15A and 15B may further be provided with a respective retention clip 21A and 21B as part of the vehicle support bracket for example to retain the respective shorter lever portions 29A and 29B in the rotated positions. Disassembly for headlamp servicing is merely a matter of rotating the cam pins 90 degrees and removal thereof.

While the present invention has been described with respect to certain embodiments, it is recognized that certain alternatives within the scope of the invention may be apparent to those having ordinary skill in the art. Therefore, the embodiments described herein are to be taken by way of non-limiting examples of embodiments of the invention which is limited only by the scope of the claims as follows.

I claim:

1. A vehicle headlamp mounting system comprising:

a support bracket secured to a vehicle;

a headlamp assembly; and, a cam pin inserted through respective apertures formed in the headlamp assembly and the support bracket, the headlamp assembly and the support bracket having a first positional relationship characterized by an offset of the respective apertures when the cam pin is in a first rotational orientation and a second positional relationship characterized by substantial alignment of the respective apertures when the cam pin is in a second rotational orientation.

2. A vehicle headlamp mounting system as claimed in claim 1 wherein the headlamp assembly comprises the vehicle headlamp adjustably mounted to a headlamp mounting bracket including the respective aperture of the headlamp assembly.

3. A vehicle headlamp mounting system comprising:

a support bracket secured to a vehicle having a first aperture;

a headlamp assembly having a second aperture adjacent the first aperture; and, a cam pin inserted through the adjacent first and second apertures for interlocking the headlamp assembly and support bracket;

the headlamp assembly and support bracket characterized by a relaxed interlock and offset of the respective apertures when the cam pin is in a first rotational orientation and characterized by a snug interlock and substantial alignment of the respective apertures when the cam pin is in a second rotational orientation.

4. A vehicle headlamp mounting system as claimed in claim 3 wherein the headlamp assembly comprises the vehicle headlamp adjustably mounted to a headlamp mounting bracket including the respective aperture of the headlamp assembly.

5. A vehicle headlamp mounting system for securing a headlamp assembly of a vehicle comprising:

a support bracket secured to the vehicle having upper and lower mounting tabs projecting therefrom, each mounting tab defining a respective aperture therethrough which is substantially aligned with the aperture of the other mounting tab;

a headlamp assembly including a headlamp mounting bracket, the headlamp mounting bracket being wedged between the mounting tabs and having apertures adjacent the upper and lower mounting tabs and respective apertures; and, a cam pin inserted through the respective apertures of the mounting tabs and the headlamp mounting bracket to interlock the support bracket and headlamp mounting bracket, the cam pin having a first rotational orientation characterized by offset of the mounting tab apertures and headlamp bracket apertures and a second rotational orientation characterized by substantial alignment of the mounting tab apertures and headlamp bracket apertures.

6. A vehicle headlamp mounting system as claimed in claim 5 wherein the cam pin includes a lever portion for providing a mechanical advantage to cam pin rotation.

7. A vehicle headlamp mounting system as claimed in claim 6 further comprising a retention clip for trapping the lever portion of the cam pin to retain the cam pin in the second rotational orientation.

8. A vehicle headlamp mounting system as claimed in claim 5 wherein the headlamp assembly apertures are joined by a channel effective to guide the cam pin during assembly.

* * * * *